April 21, 1959     A. BINNS     2,883,079
TRUCKS, LORRIES AND THE LIKE
Filed May 6, 1957     2 Sheets-Sheet 1
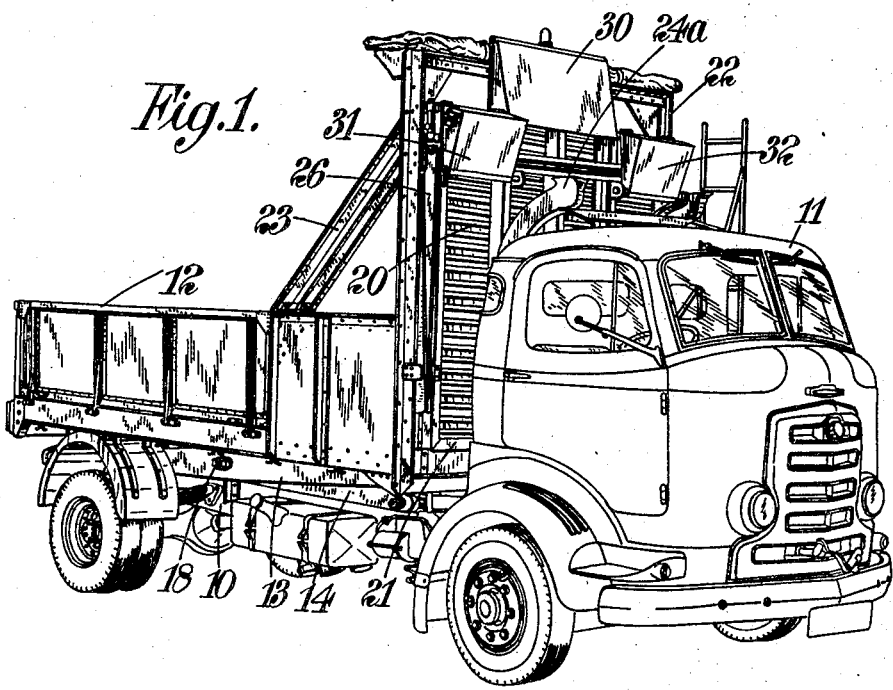

April 21, 1959            A. BINNS            2,883,079
TRUCKS, LORRIES AND THE LIKE
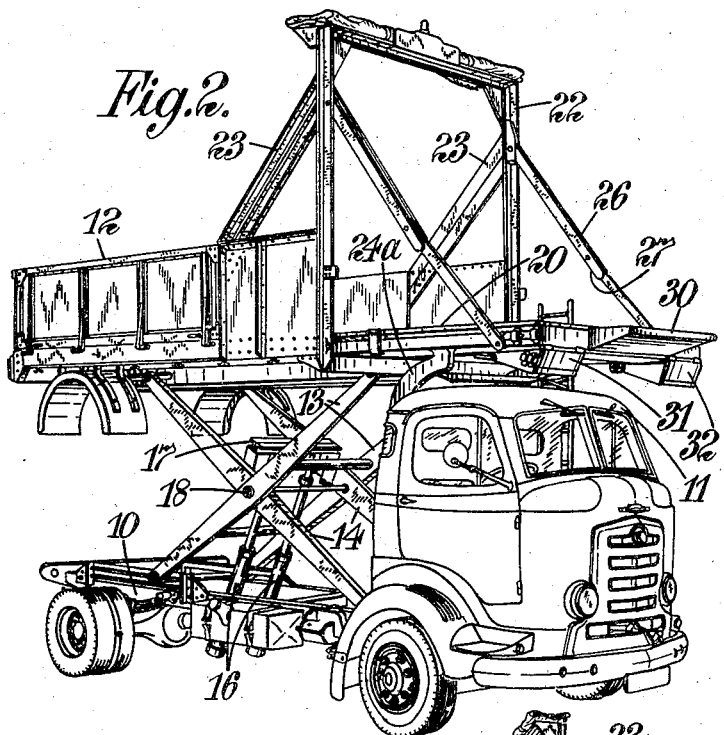
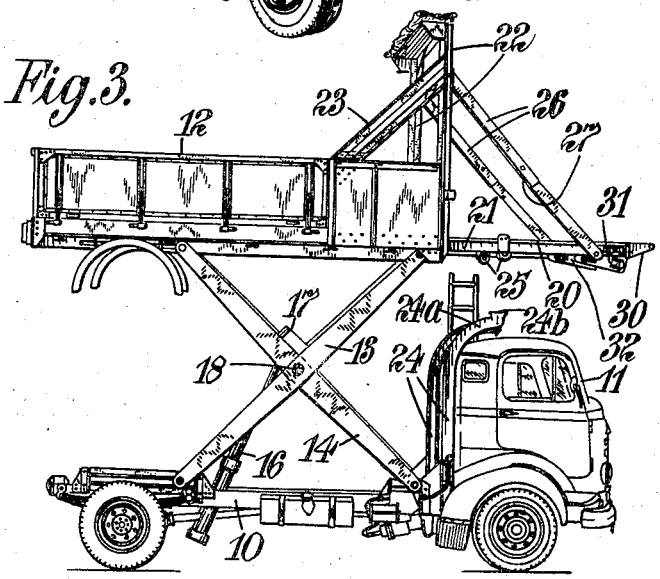

United States Patent Office 2,883,079
Patented Apr. 21, 1959

2,883,079

TRUCKS, LORRIES AND THE LIKE

Albert Binns, Wembley Park, England, assignor to Commer Cars Limited, Luton, England, a British company Application May 6, 1957, Serial No. 657,242

Claims priority, application Great Britain June 1, 1956

3 Claims. (Cl. 214—512)

The invention relates to trucks, lorries, vans and the like road vehicles, whether covered or uncovered, and of the kind having a load carrying body carried on a wheeled chassis behind a driver's cab by means which enable the body and any load carried thereby to be raised for loading and unloading at an elevated position. Such vehicles, which may for example be used for loading and unloading aircraft, are hereinafter referred to as lifting trucks of the kind described.

It is desirable, especially for loading and unloading aircraft, that the truck may be driven forward to the loading station and it is an object of the invention to provide a practical construction which enables this to be effected in respect of the elevated position.

According to the invention a lifting truck of the kind described is characterised by a platform or bridge which, when the body is in an elevated position, may be extended over the driver's cab whereby loading and unloading at the elevated level may be carried out from the front of the truck over the top of the cab.

In one construction according to the invention the platform is hinged to the body at about floor level and is extended by downward hinging movement about its lower edge from an upright attitude. The platform in this construction may, when upright, form the front wall or headboard of the body and lie behind the cab when the body is in the lowered position.

It is an important feature of a preferred construction according to the invention that means are provided for automatically extending the platform as the body is raised. When the platform is hinged as above described these means may comprise one or more upright guides behind the cab and extending partly over the top thereof and co-operating with a roller or roller on the platform above the hinge axis to draw the platform forwardly and downwardly as the body rises above the level of the top of the cab.

The platform may have a length to extend to the front of the vehicle and its front edge may be constructed in sections at least some of which are removable (e.g. hinged) whereby the effective width of the front of the platform may be varied for fitting into aircraft loading hatches of different widths.

A specific construction of a lifting truck embodying a loading platform according to the invention will now be described by way of example and with reference to the accompanying drawings in which:

Figure 1 is a perspective view of the truck with the body in its lowered position, Figure 2 is a view similar to Figure 1 but showing the body in an elevated position, and Figure 3 is a side view showing the body at the limit of its upward movement.

The lifting truck forming the subject of this example is intended for use in loading and unloading aircraft. The truck has a four-wheeled chassis 10 of conventional construction with a driver's cab 11 at the front.

The body 12, in this example, is open and is constructed as a separate unit. The body is attached to side frame members of the chassis by two pairs of crossed scissor links 13, 14 by which the body may be given parallel up and down movements to and from a position (Figure 3) in which it is raised well above the top of the cab. Up and down movements are effected by a pair of hydraulic jacks 16 acting between the chassis and a cross bar 17 attached to the links adjacent to the scissor pivots 18 thereof.

The headboard 20 of the body is of substantial height and is hinged at its lower edge 21 to the body at about floor level. Surrounding this wall there is an upright rectangular frame 22 secured to the body and supported from the sides thereof by rigid stays.

Extending upwardly from the chassis 10 behind the cab 11 and curved over the top of the rear portion of the cab there are two channel section guides 24 and running in these guides there are rollers 25 attached to the front face of the wall 20 above the hinge. The arrangement is that during the first part of the upward movement of the body the rollers 25 run in the upright sections of the guides 24 and the front wall moves upwardly with the body retaining its upright attitude. As the flood of the body approaches the level of the top of the cab the rollers move into the curved sections 24a of the guides and the front wall 20 is progressively lowered into a horizontal position (see Figure 2) in which it forms a platform or bridge over the top of the cab 11. Folding stays 26 between the platform and the upright frame 22 serve to support the platform. The upper ends 24b of the guides 24 are open so that the rollers may leave the guides and upward movement of the body and platform be continued if desired. Figure 3 shows the body and platform at the upper limits of such continued movement.

The folding stays 26 are held, by hinge stops 27, out of the aligned position so that on downward movement of the body the reverse action takes place (i.e. the stays fold together and the platform hinges upwardly) and the platform returns to the upright attitude.

The platform when lowered over the cab extends to the front of the vehicle and at its front edge it is constructed in three sections. The centre section 30 is fixed whereas the two outer sections 31, 32 are hinged and may (as seen in Figures 1 and 2) be folded back against the underside of the platform when not required. The arrangement permits the centre section alone to be inserted into a narrow loading hatch and all three sections or the centre section and either outer section to be inserted into a wide hatch and to rest on the aircraft floor. Each section is in the form of a ramp.

In use, if it is desired to load, or unload, goods through a hatch above the level of the top of the cab the truck is driven forwards to the loading station. The body is then raised by the hydraulic jacks which automatically lowers the platform to extend forwardly over the cab. If necessary to obtain the required height the body may be further elevated lifting the rollers out of the guideways as in Figure 3. The truck may then be advanced to insert the front edge of the platform or appropriate sections thereof, into the hatch and the body lowered until the edge rests on the aircraft floor. Goods may then easily be transferred between the body and the aircraft over the platform.

If the goods are to be loaded or unloaded through a hatch which is below the level of the cab top then the truck may be backed up to the hatch in the usual way. The body may then be raised, if necessary, to bring the floor up to the hatch level.

I claim:

1. A road vehicle having a wheeled chassis, a driver's cab at the front of the chassis, a body carried by the chassis behind the cab, said body having a floor and a headboard which is hinged about an axis at floor level for downward forward movement from an upright position to a horizontal forwardly extending position, means for raising and lowering the body vertically with respect to the chassis, at least one fixed guide rail having a portion which extends vertically between the headboard and the cab and a portion extending from said vertical portion which is curved over the top of the cab and a runner attached to the headboard and running on the guide rail in co-operation therewith first, as the body is raised, to constrain the headboard to move vertically as the runner travels along the vertical portion of the guide rail and then to constrain the headboard to hinge downwardly to lie horizontally over the top of the cab and, as the body is lowered, first to constrain the headboard to hinge upwardly to the upright position thereof and then to constrain the headboard to remain in the upright position.

2. A vehicle as claimed in claim 1, in which the guide rail is of channel section with the mouth of the channel facing transversely of the vehicle and the guide means comprise a roller running within the channel and embraced thereby.

3. A vehicle as claimed in claim 2 in which the upper end of the channel is open and faces upwardly so that the roller can leave the channel for further upward movement of the body.

References Cited in the file of this patent

UNITED STATES PATENTS

| | | |
|---|---|---|
| 1,817,418 | Mumms | Aug. 4, 1931 |
| 2,412,158 | Kuehlman | Dec. 3, 1946 |
| 2,797,833 | Cash | July 2, 1957 |